US012626108B2

(12) United States Patent
Padgett et al.

(10) Patent No.: US 12,626,108 B2
(45) Date of Patent: May 12, 2026

(54) SIMILARITY-BASED GENERATIVE AI OUTPUT FILTERING

(71) Applicant: Shopify Inc., Ottawa (CA)

(72) Inventors: Neil Leonard Padgett, Toronto (CA); Andra Adams, Vankleek Hill (CA)

(73) Assignee: Shopify Inc., Ottawa (CA)

( * ) Notice: Subject to any disclaimer, the term of this patent is extended or adjusted under 35 U.S.C. 154(b) by 532 days.

(21) Appl. No.: 18/313,688

(22) Filed: May 8, 2023

(65) Prior Publication Data

US 2024/0160902 A1 May 16, 2024

Related U.S. Application Data

(60) Provisional application No. 63/480,135, filed on Jan. 17, 2023, provisional application No. 63/424,577, filed on Nov. 11, 2022.

(51) Int. Cl.
*G06N 3/04* (2023.01)
*G06N 3/0475* (2023.01)

(52) U.S. Cl.
CPC ................................. *G06N 3/0475* (2023.01)

(58) Field of Classification Search
CPC .... G06N 3/0475; G06N 3/0985; G06N 3/006; G06N 3/044; G06N 3/084; G06N 20/00; G06N 3/0464; G06N 3/0499; G06N 3/092; G06N 3/0455; G06N 3/047; G06N 3/088; G06N 3/0895; G06N 3/09
See application file for complete search history.

(56) References Cited

U.S. PATENT DOCUMENTS

| | | |
|---|---|---|
| 2019/0295223 A1 | 9/2019 | Shen et al. |
| 2020/0372308 A1 | 11/2020 | Anirudh et al. |
| 2021/0125061 A1 | 4/2021 | Munoz et al. |
| 2021/0158815 A1 | 5/2021 | Lee |
| 2021/0272341 A1 | 9/2021 | Swaminathan et al. |
| 2022/0067902 A1 | 3/2022 | Dou |
| 2022/0101149 A1* | 3/2022 | Kwatra ................ G06N 3/0442 |
| 2022/0335066 A1* | 10/2022 | Hedayati ............... G06F 16/285 |
| 2022/0383615 A1 | 12/2022 | Saraee et al. |
| 2023/0230198 A1 | 7/2023 | Zhang et al. |
| 2024/0161258 A1 | 5/2024 | Maschmeyer et al. |
| 2024/0193913 A1 | 6/2024 | Saraee et al. |

(Continued)

OTHER PUBLICATIONS

Lee Helmers et al., Automating the search for a patent's prior art with a full text similarity search, Machine Learning Group, Technische Universita t Berlin, Berlin, Germany (Year: 2019).*

(Continued)

*Primary Examiner* — Masud K Khan

(74) *Attorney, Agent, or Firm* — Rowand LLP

(57) ABSTRACT

Methods and systems for generating output content using a generative artificial intelligence (AI) model based on an input. A similarity-assessment layer at the output of the generative AI model determines a similarity measure for the output content vis-à-vis pre-existing items in a repository. The similarity measure is compared to a threshold value and, responsive to the comparison indicating excessive similarity, one or both of the input and the generative AI model are adjusted, and the generative AI model is re-run to generate new output content.

20 Claims, 9 Drawing Sheets

(56) References Cited

U.S. PATENT DOCUMENTS

2024/0296535 A1    9/2024  Bakunov et al.

OTHER PUBLICATIONS

The role of explainability in creating trustworthy artificial intelligence for health care: a comprehensive survey of the terminology, design choices, and evaluation strategies, Aniek F. Markusa* MSc, et al. Dec. 30, 2020.
USPTO: US Office Action relating to U.S. Appl. No. 18/145,160, dated Jun. 4, 2025.

* cited by examiner

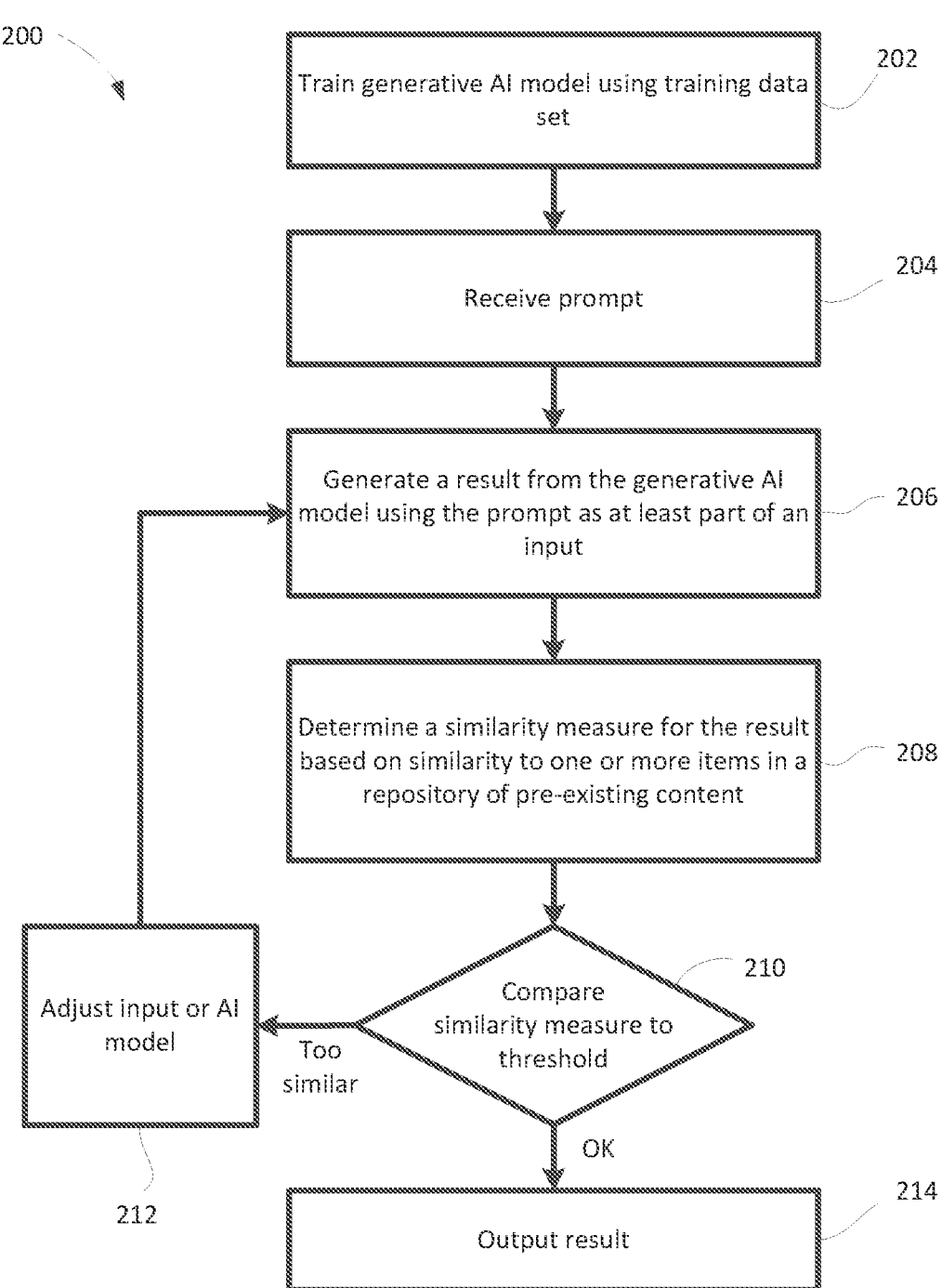

200

Train generative AI model using training data set — 202

Receive prompt — 204

Generate a result from the generative AI model using the prompt as at least part of an input — 206

Determine a similarity measure for the result based on similarity to one or more items in a repository of pre-existing content — 208

Compare similarity measure to threshold — 210

Adjust input or AI model — 212

Too similar

OK

Output result — 214

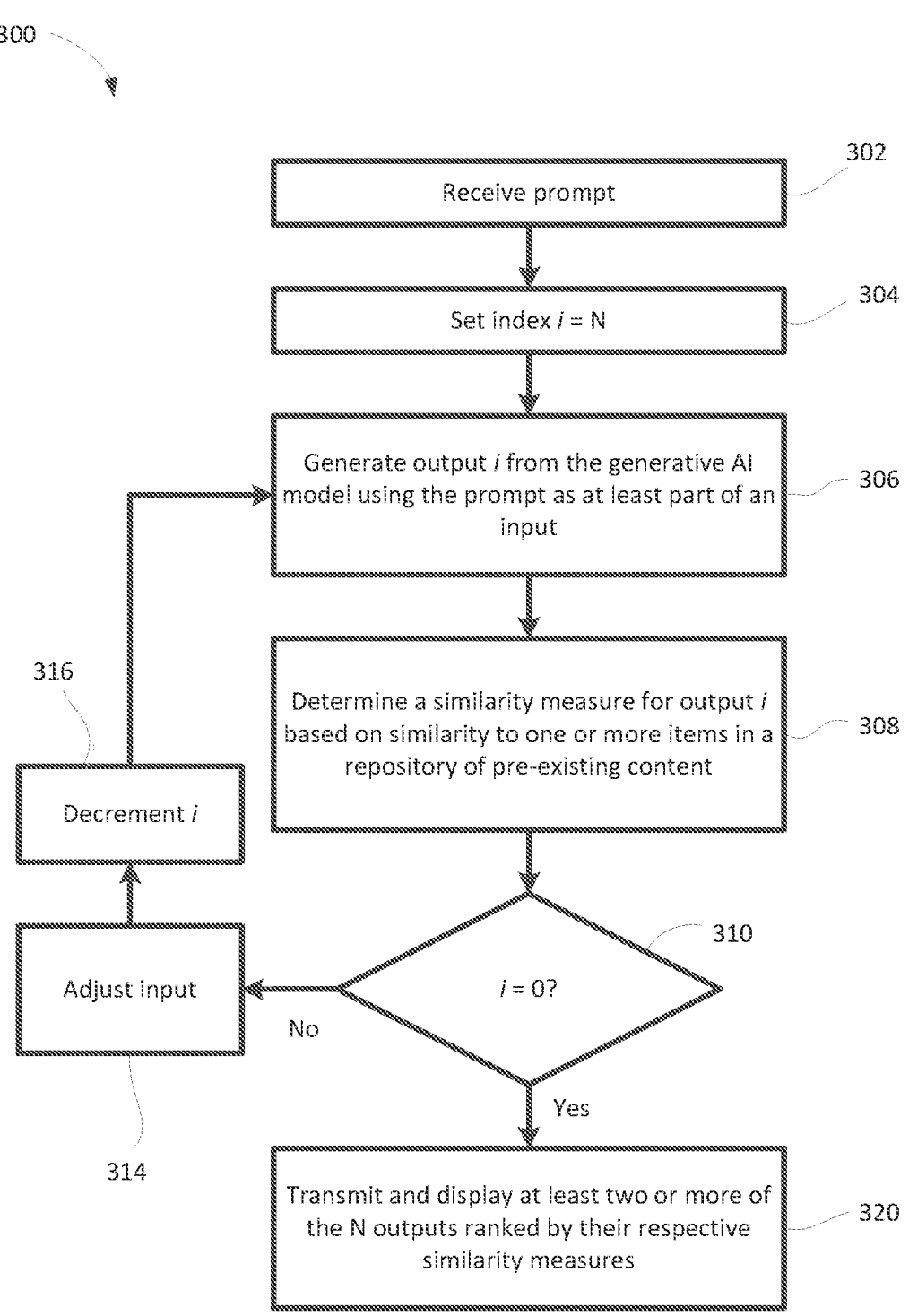

302

Receive prompt

304

Set index *i* = N

306

Generate output *i* from the generative AI model using the prompt as at least part of an input

308

Determine a similarity measure for output *i* based on similarity to one or more items in a repository of pre-existing content

316

Decrement *i*

310

*i* = 0?

314

Adjust input

No

Yes

320

Transmit and display at least two or more of the N outputs ranked by their respective similarity measures

FIG. 3B

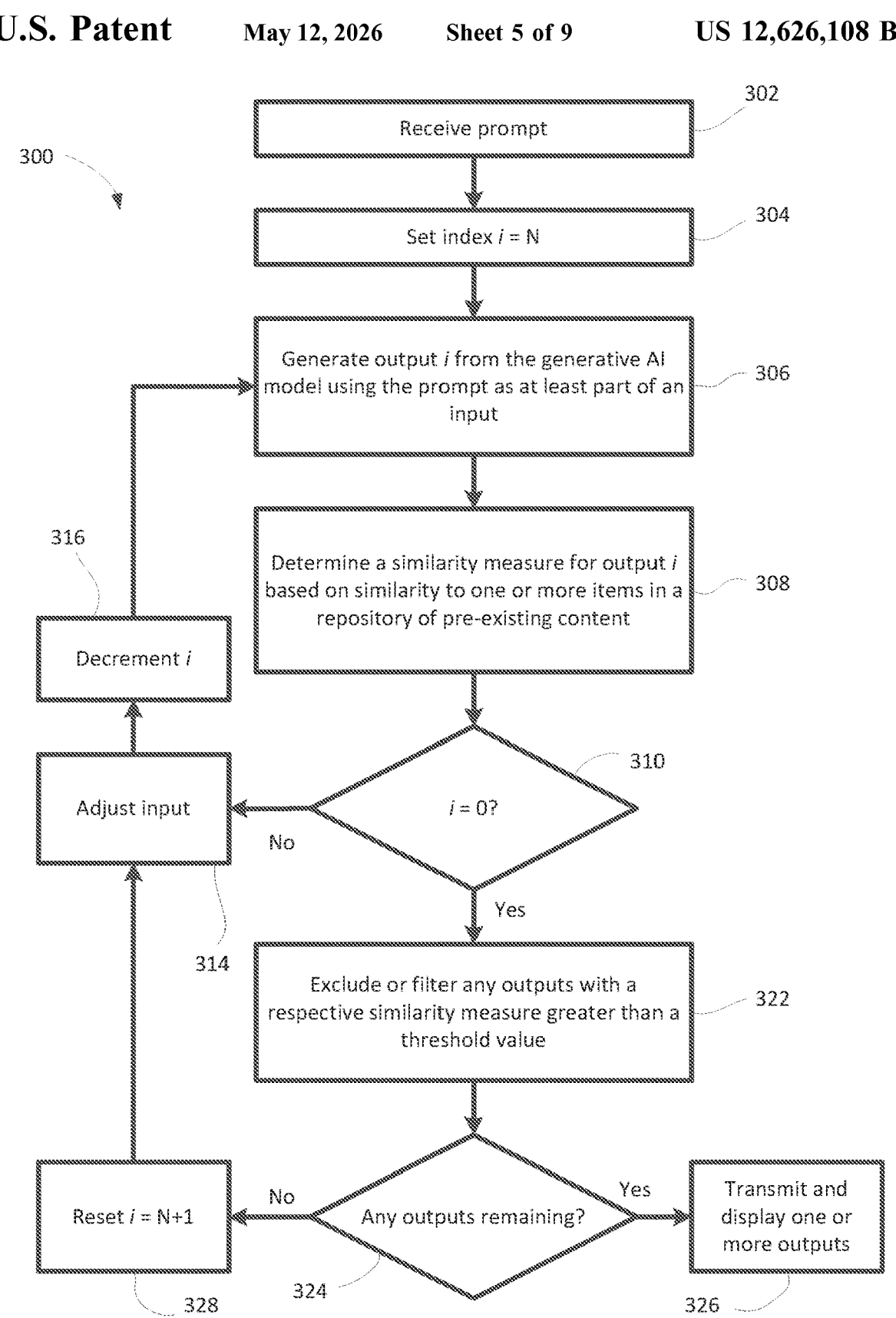

300

302 Receive prompt

304 Set index *i* = N

306 Generate output *i* from the generative AI model using the prompt as at least part of an input 308 Determine a similarity measure for output *i* based on similarity to one or more items in a repository of pre-existing content 316 Decrement *i*

314 Adjust input

310 *i* = 0?

No

Yes

322 Exclude or filter any outputs with a respective similarity measure greater than a threshold value 328 Reset *i* = N+1

No

324 Any outputs remaining?

Yes

326 Transmit and display one or more outputs

FIG. 3C

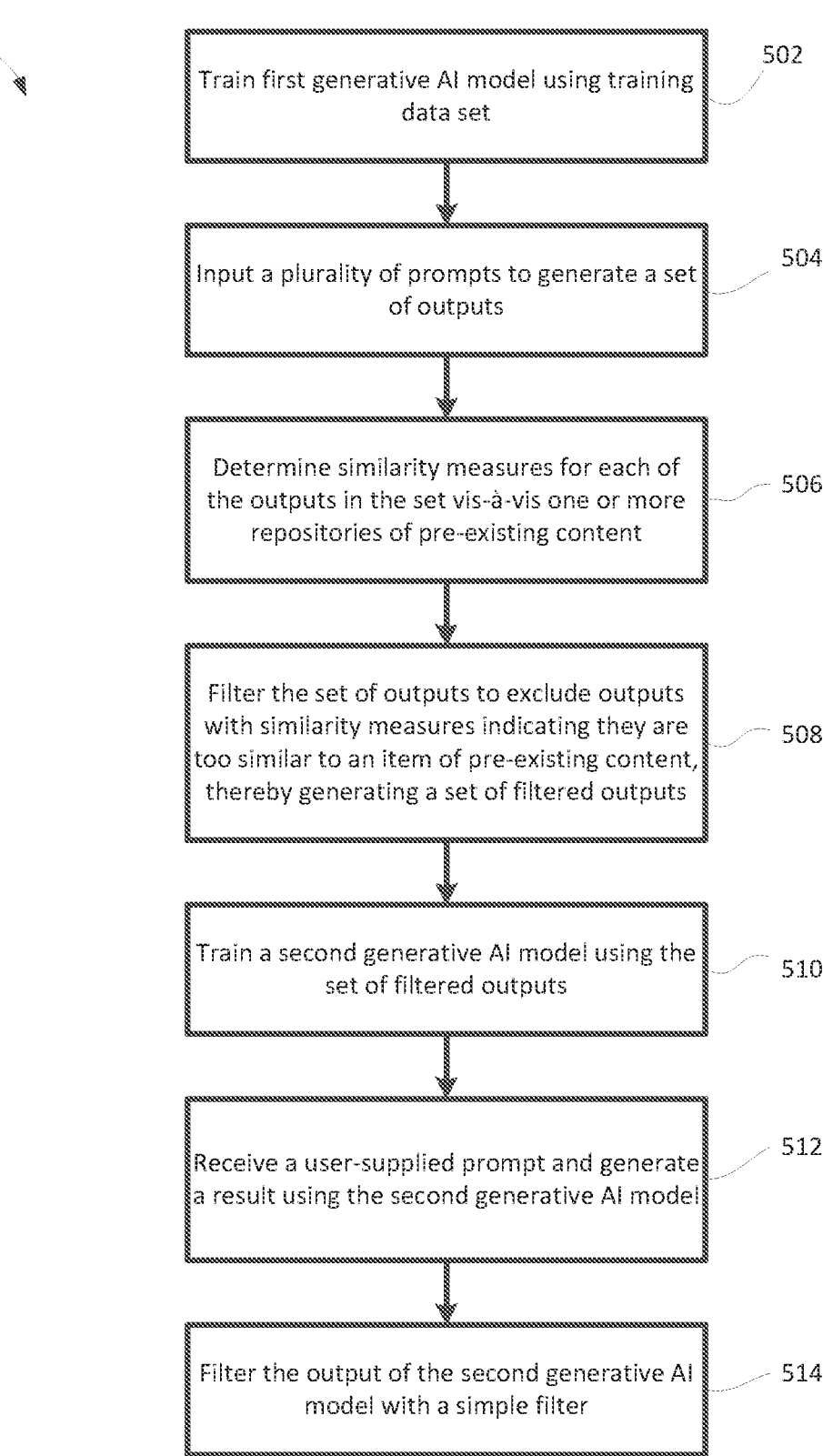

500

502
Train first generative AI model using training data set

504
Input a plurality of prompts to generate a set of outputs

506
Determine similarity measures for each of the outputs in the set vis-à-vis one or more repositories of pre-existing content 508
Filter the set of outputs to exclude outputs with similarity measures indicating they are too similar to an item of pre-existing content, thereby generating a set of filtered outputs 510
Train a second generative AI model using the set of filtered outputs 512
Receive a user-supplied prompt and generate a result using the second generative AI model 514
Filter the output of the second generative AI model with a simple filter

FIG. 5

SIMILARITY-BASED GENERATIVE AI OUTPUT FILTERING

CROSS-REFERENCE TO RELATED APPLICATION

The present application claims the benefit of priority to U.S. Provisional Patent Application No. 63/424,577 filed on Nov. 11, 2022, and to U.S. Provisional Patent Application No. 63/480,135 filed on Jan. 17, 2023, the contents of each of which are incorporated herein by reference.

TECHNICAL FIELD

The present disclosure relates to generative artificial intelligence (AI) systems.

BACKGROUND

The present disclosure relates to generative artificial intelligence (AI) systems, which may sometimes employ language learning models (LLMs). In the present application, the term generative AI model may be used to describe a machine learning model (MLM). A trained generative AI model, e.g. an LLM, may respond to an input prompt by generating and producing an output or result. The output or result may be generated by the generative AI model through interpreting the intent and context of the prompt. In some cases, the generative AI model may be implemented with constraints on the acceptable prompts. In some cases, this may include a prompt template. A prompt template may specify that prompts have a certain structure or constrained intents, or that acceptable prompts exclude certain classes of subject matter or intent, such as the production of results or outputs that are violent, pornographic, etc.

Significant advances have been made recently in generative AI models. Different implementations may be trained to create digital art, computer code, conversation text responses, or other types of outputs. Examples include Stable Diffusion by Stability AI Ltd., ChatGPT by OpenAI, DALL-E 2 by OpenAI, and GitHub CoPilot by GitHub and OpenAI. The generative AI models are typically trained using a large data set of example training data. For instance, in the case of AI for generating images, the training data set may include a database of millions of images tagged with information regarding the contents, style, artist, context, or other data about the image or its manner of creation. The generative AI trained on such a data set is then able to take an input prompt in text form, which may include suggested topics, features, styles or other suggestions, and provide an output image that reflects, at least to some degree, the input prompt.

BRIEF DESCRIPTION OF THE DRAWINGS

Embodiments will be described, by way of example only, with reference to the accompanying figures wherein:

FIG. 2 shows, in flowchart form, a simplified method of similarity-based generative AI output filtering;

FIG. 3B shows a further example method of similarity-based generative AI output filtering;

FIG. 3C shows yet another example method of similarity-based generative AI output filtering;

FIG. 5 shows, in flowchart form, one example method of generating outputs using a generative AI model and the system of FIG. 4;

DETAILED DESCRIPTION OF EMBODIMENTS

Figure 1:
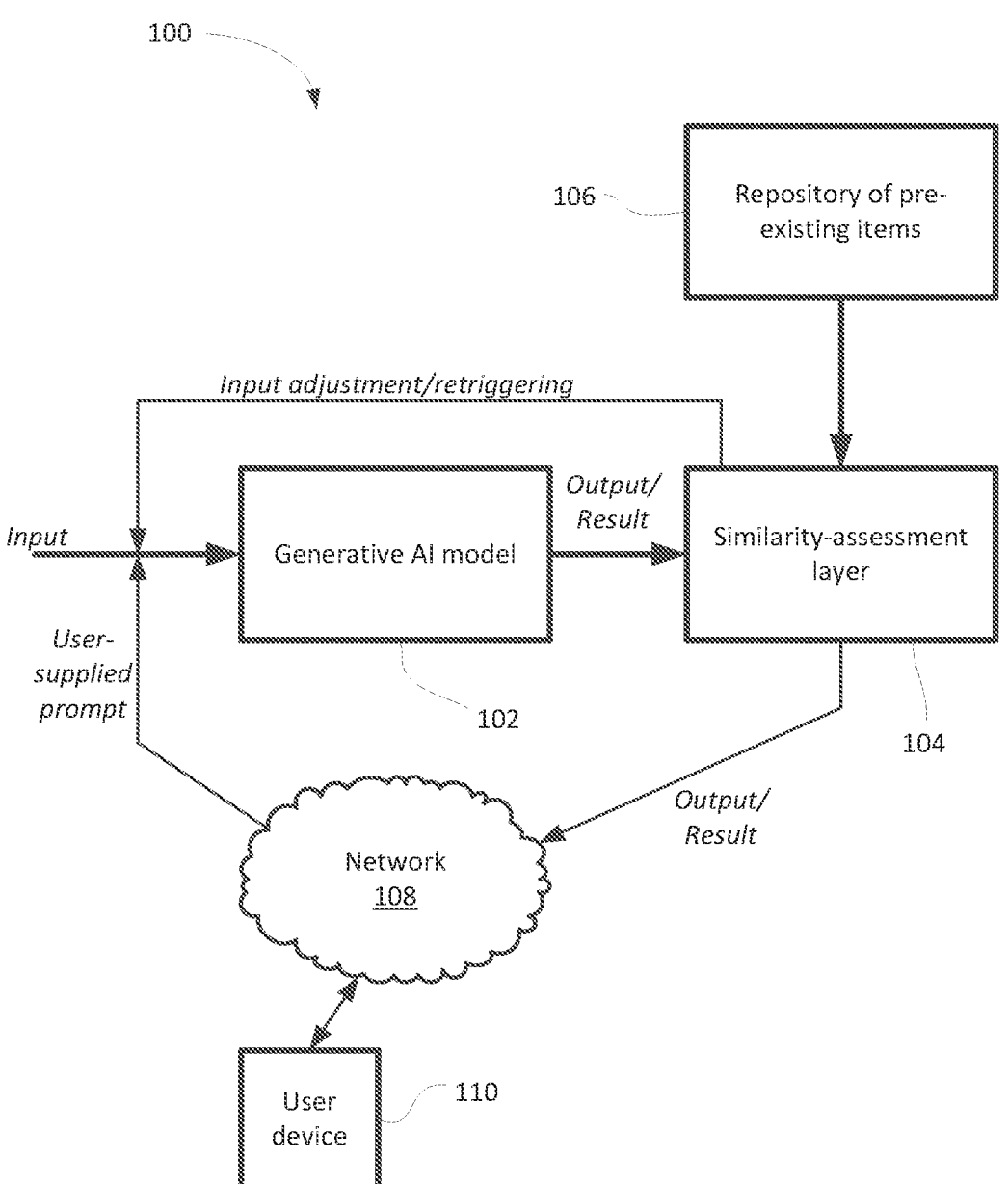
FIG. 1 illustrates, in block diagram form, an example system for similarity-based generative AI output filtering.

In an aspect, the present application discloses a computer-implemented method that may include generating output content using a generative artificial intelligence (AI) model based on an input; determining, using a similarity-assessment layer, a similarity measure for the output content with respect to a repository of pre-existing content; comparing the similarity measure to a threshold value; and responsive to the comparing indicating excessive similarity, adjusting one or both of the input and the generative AI model, and re-generating new output content using the generative AI model.

In some implementations, the method may also include repeating the generating, determining, comparing, adjusting, and re-generating until the new output content has a respective similarity measure at or below the threshold value.

In some implementations, determining the similarity measure may include calculating a distance metric by comparing the output content to items in the repository of pre-existing content. In some cases, comparing includes comparing the output content to each item in the repository of pre-existing content in turn to determine a distance value representing similarity between the output content and that item, and identifying the lowest distance value and the corresponding item as the most similar of the items to the output content.

In some implementations, the input includes a prompt and wherein adjusting the input includes changing the prompt. In some examples, the prompt includes text and changing the prompt includes changing the text. Changing the text may include one or more of replacing a word in the text with an alternative word, changing an order of words in the text, or changing a verb tense for one or more words in the text.

In some implementations, the input includes a seed value, and adjusting the input may include changing the seed value.

In some implementations, the output content includes a text output and the similarity-assessment layer may determine an infringement probability value by comparing the text output to content in one or more databases and finding a match within a threshold value between the text output and a pre-existing text in the one or more databases.

In some implementations, the output content includes a textual or graphic brand and the similarity-assessment layer may determine an infringement probability value by comparing the textual or graphic brand with trademarks in one or more trademark databases and finding a match within a threshold value between the textual or graphic brand and at least one trademark. In some examples, the similarity-assessment layer may further receive product or service data associated with the textual or graphic brand, and comparing and finding may include comparing the product or service data with goods and services data associated with trademarks in the one or more trademark databases.

In one implementation, the similarity-assessment layer may include a machine learning model trained on an intellectual property infringement data set.

In another aspect, the present application discloses a computing system. The computing system includes a processor and a memory coupled to the processor. The memory stores computer-executable instructions that, when executed by a processor, configure the processor to generate output content using a generative artificial intelligence (AI) model based on an input; determine, using a similarity-assessment layer, a similarity measure for the output content with respect to a repository of pre-existing content; compare the similarity measure to a threshold value; and responsive to the comparing indicating excessive similarity, adjust one or both of the input and the generative AI model, and re-generate new output content using the generative AI model.

In another aspect, the present application discloses a non-transitory, computer-readable medium storing processor-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term generative AI model may be used to describe a machine learning model (MLM). A generative AI model may sometime be referred to, or may use, a language learning model or LLM. A trained generative AI model, e.g. an LLM, may respond to an input prompt by generating and producing an output or result. The output or result may be generated by the generative AI model through interpreting the intent and context of the prompt. In some cases, the generative AI model may be implemented with constraints on the acceptable prompts. In some cases, this may include a prompt template. A prompt template may specify that prompts have a certain structure or constrained intents, or that acceptable prompts exclude certain classes of subject matter or intent, such as the production of results or outputs that are violent, pornographic, etc.

Significant advances have been made recently in generative AI models. Different implementations may be trained to create digital art, computer code, conversation text responses, or other types of outputs. Examples include Stable Diffusion by Stability AI Ltd., ChatGPT by OpenAI, DALL-E 2 by OpenAI, and GitHub CoPilot by GitHub and OpenAI. The generative AI models are typically trained using a large data set of example training data. For instance, in the case of AI for generating images, the training data set may include a database of millions of images tagged with information regarding the contents, style, artist, context, or other data about the image or its manner of creation. The generative AI trained on such a data set is then able to take an input prompt in text form, which may include suggested topics, features, styles or other suggestions, and provide an output image that reflects, at least to some degree, the input prompt.

While there has been rapid recent growth in the capabilities of generative AI systems, some shortcomings have become apparent. In some cases, the AI systems may produce "problematic" outputs. A first example of a "problematic" output is one in which some part or portion of the training data set is replicated in the output. This is sometimes referred to as a "rote learning" problem. In some cases, this may not be problematic, but in others it can be, such as where that portion of the training data is not permitted to be disclosed or revealed or copied. In another example, a "problematic" output may be one that is identical to, or too similar to, a pre-existing item. In yet another example, a generative AI system can sometimes be 'tricked' into revealing a portion of a prompt template that is not supposed to be revealed in the output. The nature of what is "problematic" may vary in different contexts; however, in this example, it refers to an output that is "too similar" to some pre-existing content.

The pre-existing content may include content within the training data or other pre-existing content. If the pre-existing content is training data, i.e. if the problematic output matches or is very similar to an item in the training data set, this may be referred to as a "rote-learning problem". As an example, an AI designed to generate suggested computer code, like GitHub CoPilot, may produce a section of code that exactly matches a section of code within its training data set. This might be more common in instances where that section of code is a commonly-accepted template or precedent, such as a standard incorporation of certain libraries or setting of initial variables or other parameters. In those cases, with more commonplace sections of code, the section of code may be one that appears more than once in the training data set. And in some instances, this may not be considered problematic, but it can arise with less "standardized" code that might leak through into the outputs from training data set.

Rote-learning is only one potential problematic output. Output may also be problematic if it is too similar to other pre-existing content. The pre-existing content may or may not be part of the training data used in training the model.

In some cases, it may be reassuring that the AI model produces content that is similar to, or matches, known pre-existing content, as it may indicate that the model is well-trained. However, output content that matches, or is at least too similar to, an item of pre-existing content may constitute a problem for usefulness and/or applicability of the output in some or all domains. For example, the pre-existing content may be subject to intellectual property protection, such as copyright or trademark protection. Even if uncertain as to whether it would be considered "infringing" in a legal sense, the similarity may be such that it poses a risk (legal, reputational, and/or otherwise) to use the output content. In another example, the pre-existing content may include personally identifying information (PII). The PII may leak from the training data or from the input prompt into the output, or may form part of a generated output that happens to match PII stored in a private but external data set, such that release of the output could potentially expose PII that would otherwise be confidential. Even if not strictly PII, it may be problematic to inadvertently expose confidential information, since it could lead to accusations of 'dozing' or even the tort of intrusion upon seclusion.

Aside from the rote-learning example, it may be nearly impossible to "trace" outputs that are too similar to pre-existing content to identify one or more items in the training data set that would have "caused" (if that can be understood) the model to produce the problematic output, making it very difficult or impossible to fix the training data and, thus, the model.

One potential approach to the issue of rote-learning or other problematic outputs is to exclude from the training data any content that is not freely available, i.e. exclude any material that is protected by copyright, trademark, privacy, or other forms of intellectual property protection. However, this may have the effect of biasing the training data set to low quality or old input content. As an example, if the training data set is for training an AI designed to produce high quality commercial logo suggestions or branding slogans or marketing campaigns, excluding the best available commercial examples of such content from the training data set may result in a much less useful AI model that produces poorer quality outputs.

It would be advantageous to provide for systems and methods that improve generative AI models in a manner that avoids or reduces "problematic" outputs, i.e. outputs that are too similar to pre-existing content, without necessarily compromising the quality of the training data set. In one aspect, the present application provides for a similarity-assessment layer that determines a similarity measure for the output of a generative AI model. The similarity measure is based on a determination of the similarity of the output to items in a repository of pre-existing content. The determination of similarity may be based on a distance metric that evaluates the similarity of two items (text, images, multimedia, or other content). Examples may include an L1 norm, L2 norm, Chebyshev distance, Euclidean distance, cosine distance, or others.

The repository of pre-existing content may include private or public repositories of data. In some example cases, the pre-existing content may include a public IP database or registry containing records of pending or registered intellectual property content. The repository may include all or some of the set of training data. For example, a subset of the training data may be selected on the basis that it is not public domain content, or it is only available for use under a certain class of license. In some cases, only portions of the items of training data are put in the repository, such as sections or parts of computer code that are considered unique or proprietary, and not sections that are considered public domain or standardized. The content in the training data may have been tagged to indicate whether it was public domain or not, or unknown, and the subset of training data that is not public domain may be selected and form the repository of pre-existing content.

To better illustrate additional details regarding the methods and systems of the present application some concepts relevant to generative AI models, neural networks, and machine learning (ML), are first discussed.

Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 7:
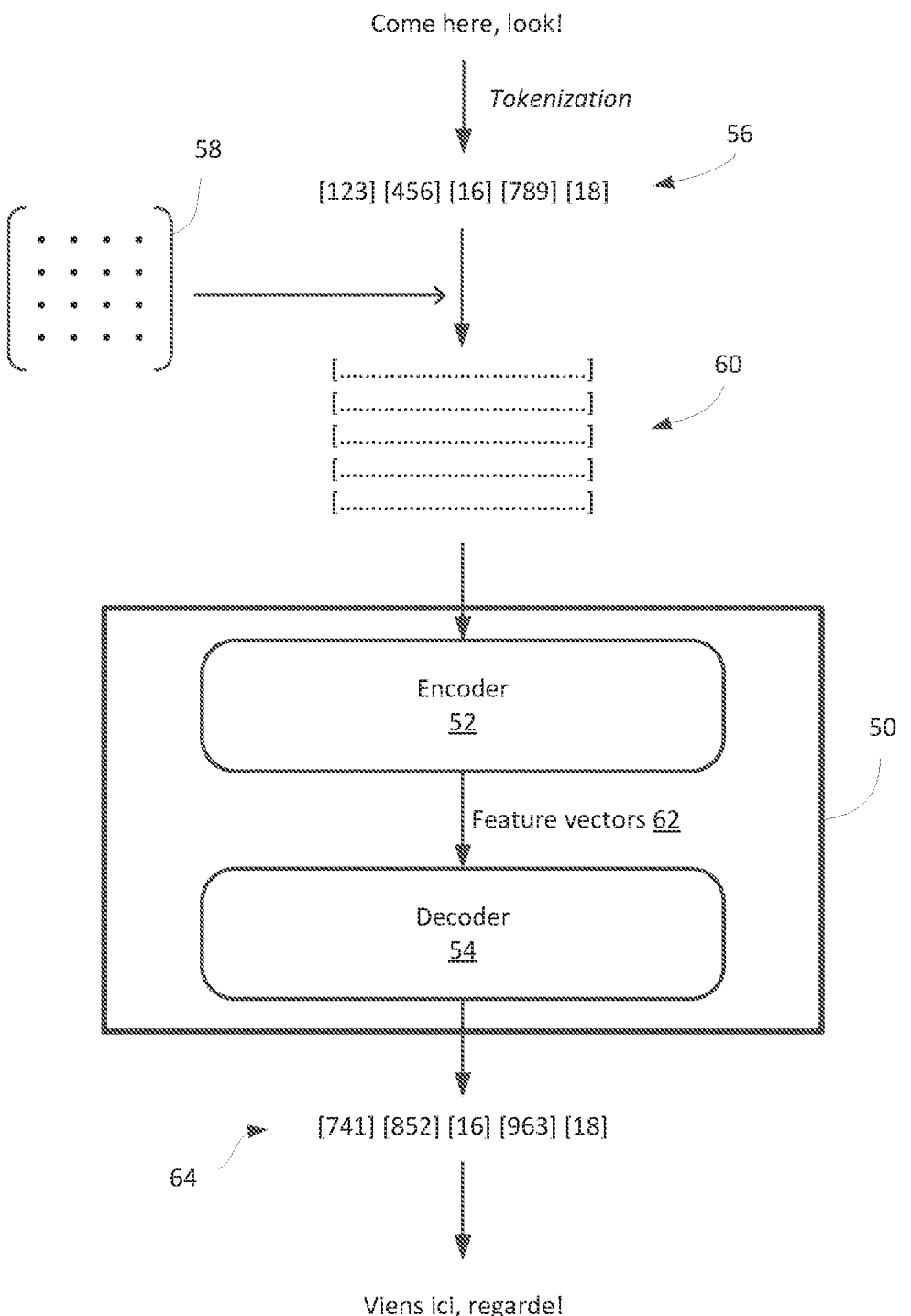
FIG. 7 is a block diagram of a simplified transformer neural network, which may be used in examples of the present disclosure. Like reference numerals are used in the drawings to denote like elements and features.

FIG. 7 is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 7, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 7 for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

A computing system may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Reference is now made to FIG. 1, which shows one simplified example of a system 100 in block diagram form. The system 100 may be implemented using one or more computing devices.

The system 100 includes a generative AI model 102, a similarity-assessment layer 104, and a repository of pre-existing content 106. The generative AI model 102 may be an unsupervised or semi-supervised machine learning algorithm that has been trained using a set of training data content. The generative AI model 102 may be a transformer 50 (FIG. 9), as discussed above. The generative AI model 102 is configured to take an input prompt, typically in text form but may also possibly include images or other media inputs. The model 102 creates an output related to the input prompt. In some cases, the generative AI model 102 may be configured to produce suggested computer code in response to an input snippet of code for context or in response to a textual description of the desired function or purpose of the code. The model 102 may be a generative adversarial network in some implementations. The model 102 may be a transformer-based model in some implementations.

In some cases, the prompt is a user-supplied prompt that is received from a user device 110 via a network 108, such as the Internet. The system 100 may be configured to send the output over the network 108 to the user device 110.

The similarity-assessment layer 104 receives the output generated by the model 102 and measures the similarity between the output and one or more items in the repository of pre-existing content 106. The measurement may be a similarity metric, such as a distance measurement. The similarity-assessment layer 104 may compare the output to each item in the repository of pre-existing content 106 in turn. With each comparison the layer 104 may calculate a similarity measure between the output and the item. As it progresses through the comparisons between the output and the items in the repository of pre-existing content 106, the layer 104 may retain only the highest similarity measure. In some cases, it stores the highest similarity measure and at least an identifier of the corresponding item from the repository of pre-existing content 106 in memory. Once finished, the layer 104 may then determine whether the highest similarity measure exceeds a threshold indicative of "too similar". If the index is above the threshold, i.e. the output is too similar to an item in the repository of pre-existing content 106, then the layer 104 triggers the generative AI model 102 to produce a new output.

The re-running of the generative AI model 102 may use the same input prompt, with a slight adjustment. The adjustment to the input prompt may include injection of a random seed or nonce. In some cases, the generative AI model 102 may itself be configured to use a random seed or nonce in every case such that re-running of the model 102 will always result in a change to the input prompt due to the randomized nature of the seed or nonce. In some other cases, the input prompt itself, i.e. the text of the prompt or some portion of the media (e.g. image) forming part of the prompt is altered. In order to still produce a result related to the original prompt, the adjustment to the input prompt cannot be so significant as to change its overall meaning in a fundamental manner. However, small changes to the prompt may steer the model 102 to produce a different output that avoids the similarity problem of the original output. In some cases, two or more changes may be made to the input prompt. For instance, a random seed may be changed and the text of the prompt itself may be altered, as described above.

As an illustrative example, the input prompt may be changed by changing the order of one or more words in the prompt. In another example, the tense of a phrase in the input prompt may be altered, e.g. from past tense to present tense. In another example, a synonym may be selected by the system 100 to replace one of the words in the prompt.

In another implementation, rather than directly changing the input prompt or a random seed or nonce injected with the input prompt, the system 100 may be configured to enable injection of noise during running of the model 102. That is, if the generative AI model 102 internally operates based on multiple rounds and an assessment of convergence before producing an output, the system 100 may be configured to re-run the model with the same input prompt but with the injection of "noise" at some point during the convergence. For example, after N rounds, the prospective output may be altered using "noise", which may act to steer the model to a different outcome from the original output. The "noise" may be any randomized value or operation applied to the pro-spective output to produce a (small) change in its content.

The above description refers to determination of a simi-larity measure. In some cases this measure may be a value between 0 and 1, with 0 being complete dissimilarity and 1 being a perfect match. Other ranges may be used in different implementations. The threshold against which the measure is compared may be adjusted to change the sensitivity of the analysis. A threshold closer to 1 biases the layer 104 to exclude only content that is a near match to an item in the repository of pre-existing content 106. A lower threshold would exclude content that is not a near match but is somewhat similar to the item. In some cases, rather than a similarity measure, the layer 104 may determine a dissimi-larity measure, where the threshold analysis assesses whether the dissimilarity measure is lower than a threshold or minimum value.

In some cases, a further machine learning model may be used to assess whether the output is too similar to items in the repository of pre-existing content 106. That is, the layer 104 may be implemented using an ML model that has been previously trained to identify instances of "too similar".

In some cases, the system 100 may re-run the model 102 until the similarity-assessment layer 104 determines that the most recent output has a similarity measure below the threshold, at which point it outputs the generated result. In some cases, it may run multiple times and output all results with their associated similarity measures. In some cases, it may run multiple times and output a set of N results having the lowest similarity measures. In some cases, if multiple results are output they may be output in ranked order based on their similarity measures. In some implementations, if a result cannot be produced within M rounds that has a similarity measure below the threshold then the system 100 may output an error message or the like.

In another implementation the system 100 may include a cascade of two or more similarity-assessment layers each comparing the output to a respective repository of pre-existing items.

FIG. 2 shows, in flowchart form, one example of a method 200 of generating content using an AI model. The method 200 may be, at least in part, implemented on a computing system, such as the system 100 of FIG. 1.

The method 200 may include training the generative AI model using a training data set in operation 202. The training may be done in an unsupervised, semi-supervised, or fully supervised manner. In some implementations, the training may include a two-stage training session in which a large language model is first trained on a non-specific training set. That is, the first stage may include a generic training of an LLM. In some cases, the first stage may be pre-performed by another entity that makes genericly-trained LLMs available.

The second training stage may include a more specific or fine-grained tuning of the generally-trained model using a more specific training data set. For example, the more specific training data set may be tailored to the intended purpose or objective of the LLM, such as a data set relating to corporate or brand logos in the case of creating an LLM for suggesting new logos, or the data set may be a training data set of computer code snippets or excerpts in the case of creating an LLM for generating suggested computer code.

Once the generative AI model is trained and deployed, a prompt is received in operation 204. In some cases, the generative AI model may be deployed online in a network environment, and a web interface may be provided for the submission of prompts and for the display of results. A web page or mobile app may provide the interface. The input options for the prompt may include a structured input, such as a web form or other mechanism for guiding a user to input or select data in a structured manner. In some cases, the input option for the prompt may be a free form text box enabling the user to provide any text input. In some cases, the input option may permit the input of non-text prompts, including image data, voice data, video data, or other multimedia. The prompt may be received by the system from a user device, such as a mobile device or other computing device, con-nected to a computer network, like the Internet, for access-ing and interacting with the system.

At operation 206, the generative AI model generates a result using the prompt as an input. The result may, in some implementations, be an image or a set of images. The result may be a portion of computer code, i.e. proposed lines of code in a certain programming language. The result may be a block of text or prose. The result is generated by the model based on the prompt and, in some cases, a seed value or other randomized input. In some cases, the model runs more than once, each time with a new randomized seed value in order to produce a set of results.

In operation 208, the result or results are passed from the model to the similarity-assessment layer where the result is compared to items in a repository of pre-existing content. As noted above, the comparison may include calculating a similarity measure that measures the similarity between the result and one of the items in the repository. The similarity measure may be a dissimilarity measure in some implemen-tations. Measuring similarity may be based on a distance metric that quantifies the extent to which the result differs from the item from the repository. The distance metric may employ an L1 norm, L2 norm, Chebyshev distance, Euclid-ean distance, cosine distance, or others (including, in some cases, a mathematical combination of more than one dis-tance metric such as, for example, a combination of two or more of the foregoing example metrics). In some implemen-tations, both the result and the item from the repository are processed through a simplifying filter and the filtered results are then compared to assess the distance metric.

The comparison may be carried out between the result and each item in the repository in turn. The system may track the highest similarity measure and the corresponding item, in a search for the item from the repository that is most similar to the result. In some cases, the comparison is a search-based operation in which the result is used as a search query and the repository returns one or more items that are determined to be closest to the result, and the layer then determines a similarity measure for the result with regard to each of the returned items.

In one example implementation, the images of the repository may be vectorized into a vector space. The resultant image may be vectorized into the vector space and a nearest neighbour search may be carried out to assess whether the resultant image is closer than a threshold distance to a pre-existing item.

In another example, a two-stage analysis may be carried out. For instance, the items of the repository may be tagged with textual descriptors or tags, which are then vectorized and embedded in a vector space. A text-based input prompt may be vectorized and embedded in the vector space and then subject to a nearest neighbour analysis. The nearest neighbour analysis with regard to the input prompt may use a first threshold distance that is comparatively large to be over-inclusive. Those pre-existing items that are nearest neighbours within the first threshold distance in this first stage may then be compared to the actual result that the model produces from the input prompt in order to assess whether the result is too similar using any of the comparison metrics described herein.

In a further example, each item of the repository may have an associated embedding distance in the vector space that defines, for that item, what constitutes "too similar". The embedding distance may be determined manually or by training an algorithm. For example, an algorithm may be trained using examples of 'too similar' and 'not too similar' pairings, and then may be used to determine the embedding distance for each item of a given repository of pre-existing items. When items are identified as nearest neighbours within the first threshold distance in the first stage of analysis, the system may then simply compare the distance from that item to the result with the embedding distance to determine whether the result is "too similar" to the pre-existing item.

The repository of pre-existing items may be a private database maintained locally by the system in some cases. In one example, the repository of pre-existing items is the set of training data or a subset of the training data. In some examples, the repository is one or more external databases maintained on third party computing systems and accessible by way of network connection. The one or more external databases may expose APIs to enable access and/or search queries. In some examples, the repository is obtained from an external database but is maintained as an internal repository accessible to the system. In some cases, it may be a copy of the external database that is updated from time-to-time.

Once the system has determined a similarity measure for the result from the generative AI model, it then assesses whether the similarity measure indicates that the result is "too similar". In this example the similarity measure is compared to a threshold value in operation 210. If the index exceeds the threshold, then it is deemed "too similar" to one of the items from the repository. If below the threshold, then it is sufficiently different. The threshold value may be set to tune the sensitivity of the system. In some implementations, a high threshold may be set so as to only identify exact or near-exact matches. For example, in some circumstances, a near exact match may be considered "problematic" in that it may give rise to copyright issues for being an exact or near-exact copy of a pre-existing item. In some other implementations, a lower threshold may be set to identify items similar to the result but not necessarily near copies. For example, if attempting to identify images or slogans or taglines that might be "problematic" from a trademark point of view, the threshold may be set to find items for which the result is confusingly similar, but not necessarily an exact match. In a particular example, in such cases the threshold may be set higher so as to cast a wider net. However similarity is assessed, if the result is not "too similar", then it is output at operation 214. The output of the result may include transmitting the result to a user device for display and/or storage on the user device in some cases.

If, however, the result is determined to be "too similar" based on the similarity measure in operation 210, then the system adjusts the input to the AI model in operation 212 and returns to re-run the model so as to generate and evaluate new results. The adjustment of the input may include modifying the prompt. In the case of a text prompt, this may include modifying or altering one or more words in the prompt. One or more words may be replaced by synonyms. One or more words may be added to or removed from the prompt. In some cases, a prompt in a particular tense may be converted into another tense. In some cases, the order of the words in the prompt may be altered. In the case of a non-text prompt, such as an image, one or more alterations may be applied to the image. Example operations that may be applied to an image to alter it as a prompt input include cropping, filtering, and pixel-level modifications to change luma or chroma values of individual pixels.

In yet a further example, the modification to the prompt may include the addition of negative or exclusionary text. The negative or exclusionary text may be based on the item identified as too similar. In some examples, the modification may be inclusion of text that implements the operation "AND NOT [item]". The [item] in some cases may be the actual item from the repository, or a portion of the item. In some cases, it may be one or more metatags associated with the item. In some cases, it may be inclusion of a text-based instruction such as "avoid generating output that includes or is similar to [copy of, or description, of items deemed too similar]". In some cases, the modification may include a combination of some or all of these examples.

In addition to, or as an alternative to, modifying the prompt, the system may add or change a randomized seed value that is used as part of the input.

In addition to, or as an alternative to, modifying the prompt, the system may inject noise into the generative process at a point after the input and prior to the result. For example, in a cases where the AI model operates in a multi-stage manner to generate interim results and refine them in an iterative process, the system may be configured to inject noise at one of the stages to alter an interim result, thereby steering the AI model away from the original result that had been found "too similar". The noise may be any random or pseudo-random data that alters the interim result. It may include applying a filter, convolving or otherwise combining the interim result with a random or pseudo-randomized noise pattern, or other such operations.

In yet another example, once the system determines that a result is "too similar" based on the similarity measure in operation 210, it then assesses, by checking metadata for the pre-existing item in the repository, whether the pre-existing item is subject to a license or a particular type or class of license. If no license or an insufficient license is available for the pre-existing item, then it may trigger the re-running of the process; however, if a sufficient license is available the re-running may be circumvented and the result may be presented.

The method 200 may cycle multiple times through result generation, evaluation, input adjustment, and generation of new results, until a result is produced that has a similarity measure that meets the threshold test in operation 210. In some cases, the system may set a maximum number of cycles or a time limit, such that it terminates and outputs an error notification if a result cannot be produced that meets the test in operation 210.

In some instances, the AI model may be configured to generate more than one result, and each result may be evaluated for similarity in operation 208. In operation 210, each result may have its respective similarity measure evaluated and any result that cannot meet the threshold test may be re-generated. Once a full set of results is generated such that each satisfy the test, then all results are output in operation 214. In some cases, the output of the results includes displaying them in ranked order based on their similarity measures. The order may be from lowest similarity measure to highest, in some cases. In some cases, the results are output and are displayed together with their respective similarity measures.

Figure 3A:
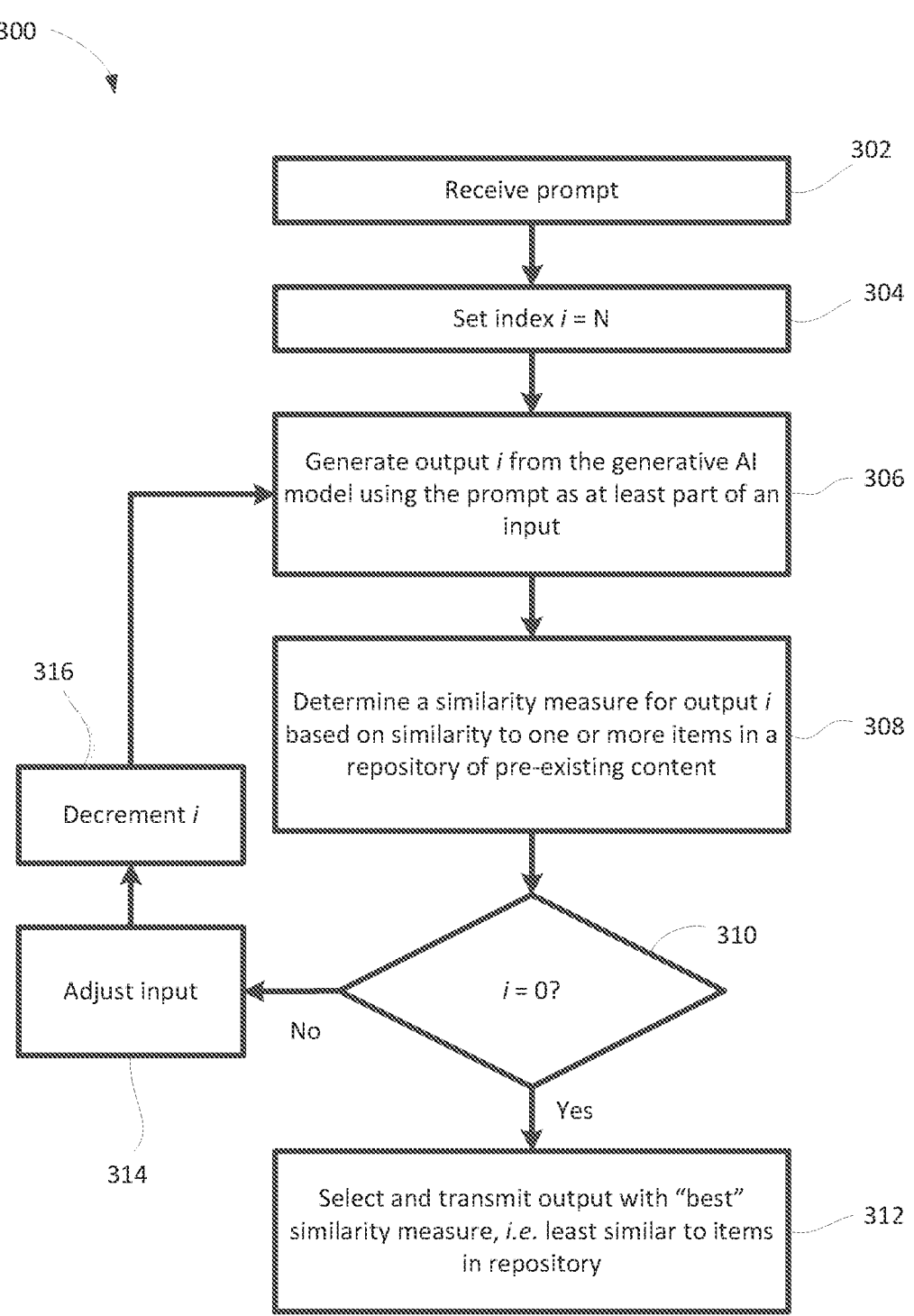
FIG. 3A shows another example method of similarity-based generative AI output filtering.

Reference is now made to FIGS. 3A, 3B, and 3C, which shows other simplified example methods 300 (indicated individually as 300a, 300b, and 300c) for generating content from an AI model. As with FIG. 2, the methods 300 may be implemented using a suitably programmed computing device. As noted above, the generative AI model may be trained with a set of training data. The generative AI model may be deployed in such a manner that it is accessible via one or more computer networks, enabling one or network-connected user devices to access the system and to submit prompts to the generative AI model.

Operation 302 of the method 300a shown in FIG. 3A includes receiving a prompt from a user device. The prompt may be a text prompt. In some cases, the prompt may include non-text matter, such as an image or other such content.

In operation 304, an index i is set to a maximum number of results, N. The generative AI model is then fed the prompt in operation 306. The prompt may be input to the generative AI model on its own or together with one or more randomized seed or nonce values. In operation 308, the system obtains the result from the generative AI model and determines its similarity measure vis-à-vis a repository of pre-existing content. A comparison between the result and the items in the repository results in a determination of the similarity measure through identifying the item with which the result is most similar and then calculating a distance metric to quantify the extent to which the result matches the item. The result and its corresponding similarity measure are retained in memory.

The system then assesses whether the index i has reached zero. If not, then the system makes a modification or adjustment to the input to the generative AI model, as indicated by operation 314, and decrements the index i in operation 316, before returning to operation 306 to re-run the model using the modified input. The modification or adjustment to the input may, in some cases, include adding or changing a randomized seed value or nonce without changing the prompt. In some cases, it may include modifying the prompt, such as through changing one or more words, rearranging two or more words, or replacing one or more words, as examples. Other modifications may also or alternatively be made to steer the model to produce a different result. As noted above, in some cases, the modification may include the injection of a noise component or some other randomization operation during running of the model, in order to tweak or change an interim result sufficiently to steer the model to a different end result.

If, in operation 310, it is determined that the index i has been reduced to zero, i.e. that the system has run the model N times producing N results each having its own respective similarity measure, then the method 300a proceeds to operation 312. In this illustrative example, at operation 312 the system selected a result from among the N results based on it having the lowest respective similarity measure. That is, it selects the result that is the most dissimilar from the items of the repository of pre-existing content, and outputs that selected result as the "best" result.

In some implementations, operation 312 further includes a threshold comparison test that evaluates whether the similarity measures are below the threshold value. It may discard any results having similarity measures above the threshold value as candidate results on the basis that they are too similar to the pre-existing content to be considered as options. In the case where none of the results have a similarity measure lower than the threshold value, the system may re-run the method 300 or may output an error message or notification.

FIG. 3B shows the method 300b, which is identical to the method 300a except that if, in operation 310, the index i is determined to be zero, then in operation 320 the system filters the results to exclude any results with a similarity index higher than the threshold and outputs all the remaining results. The remaining results may be output together with their similarity measures. In some implementations, the output of the result includes ranking them in accordance with their similarity measures. For example, results may be output in order from lowest similarity measure to highest similarity measure, where outputting includes displaying the results on a graphical user interface, such as on a user device.

FIG. 3C shows the method 300c, which is identical to the methods 300a and 300b except that if, in operation 310, the index i is determined to be zero, then the system filters the results to exclude results having a similarity measure higher than the threshold as shown by operation 322. The system then assesses whether there are any results remaining in operation 324. If so, then it outputs the remaining results in operation 326. If not, i.e. if none of the original N results had a similarity measure below the threshold, then in operation 328 the system sets the index i to N+1 and returns to operation 314, where the input is adjusted or modified, the index is decremented, and the model then re-run multiple times until the index i again reaches zero.

In the above examples, the similarity-assessment layer determines a similarity measure reflecting the degree of similarity between the output of the AI model and an item in the repository that is most similar to the output. The measured degree is used as the basis for determining whether to re-run the model to generate a new output if the measured similarity indicates it is "too similar". As described below, in some cases, the similarity-assessment layer may be configured to provide a more nuanced analysis of whether the output is "problematic" than a distance metric indicating degree of similarity.

The generative AI system may be configured to, and/or may be such that it may, produce an output that has the potential of infringing an intellectual property right. In some cases, the concern may be with copyright infringement. In some cases, the concern may be with trademark infringement. In some cases, the concern may be with design right infringement. In some cases, more than one of the foregoing concerns may coexist. The system may include a similarity-assessment layer configured to determine not only a similarity measure, but also (or alternatively) an infringement probability value. In these examples, the similarity-assessment layer may be implemented using a machine learning model (MLM) for determining an infringement probability value. The training data set using in configuring the machine learning model may includes examples of infringement and non-infringement of the relevant intellectual property right, such that the MLM is trained to receive an input candidate result from the generative AI model, and to compare that result to items from a repository of pre-existing items reflective of third-party intellectual property rights, and to output an infringement probability value.

The repository of pre-existing items may include records of registered or unregistered intellectual property rights. In the case of copyright, the repository may include copies of works protected by copyright. Because of the vast number of works potentially protected by copyright, the repository in a practical implementation may be tailored for a particular genre, such as poetry or computer code in a specific language(s).

The training data set for copyright may include examples of determinations of infringement and non-infringement drawn from case law, text books, arbitrations, and/or created by the administrator of the system. The training data set may be tailored to focus on the examples in which there is a determination of whether an allegedly infringing work has taken a "substantial" portion of a copyright protected work. The training data may be selected to tag or to exclude examples in which the infringement assessment was decided on another issue, such as defences like fair use or fair dealing, license issues, or originality disputes.

In another example, the generative AI model may be configured to provide suggested corporate logos, taglines, brand slogans or other potential trademark-related outputs. The inputs to the generative AI model may include data regarding the prospective company and/or product along with goods or services information and any other related data. The training data set for the generative AI model may include a large set of existing corporate logos, taglines, slogans, etc., each tagged with the associated goods and services linked to the branding.

The similarity-assessment layer in such a system may include an infringement-assessment MLM that determines the likelihood that an output from the generative AI model would be considered trademark infringement. The MLM may be trained on a training data set that includes examples of trademark infringement and non-infringement, including the allegedly infringing mark and the registered (or unregistered) mark. The data set may exclude examples that turn upon issues other than similarity between the marks and the goods and services associated with the marks, such as licensing issues. In some implementations, it may include examples in which the registered mark is invalidated for reasons of unregistrability.

The similarity-assessment layer may be configured to receive the output suggested by the generative AI model and the associated goods and service and additional information regarding the prospective company and/or product/service. The repository may include a database of trademark registrations in the jurisdiction(s) of interest. The repository may be a third-party database of trademark registrations in that jurisdiction, provided by a government entity or a non-government database provider.

The similarity-assessment layer (or infringement-assessment layer) may be tailored to a specific jurisdiction, e.g. country, for which the repository holds intellectual property registration data.

Figure 4:
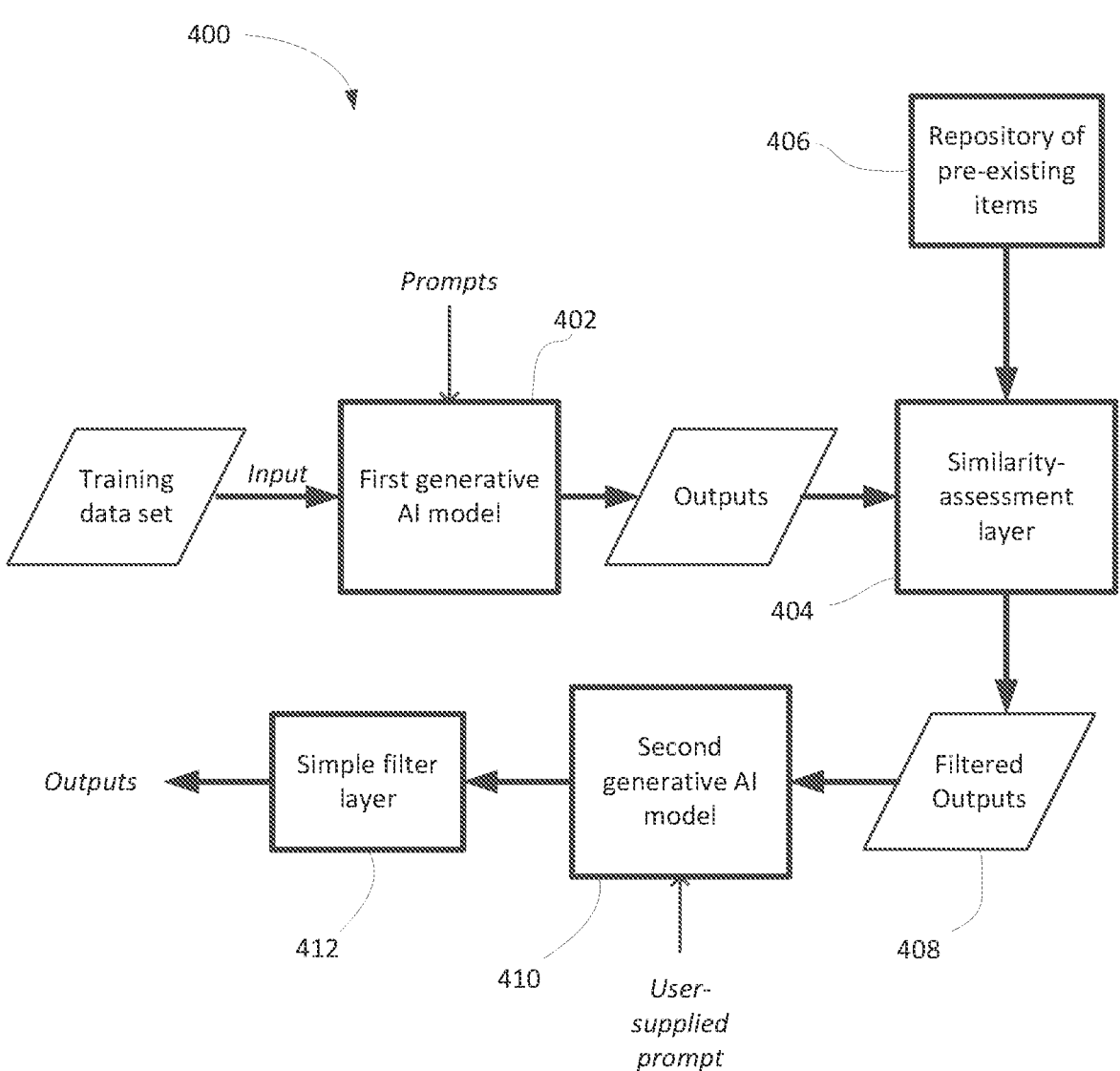
FIG. 4 shows, in block diagram form, another example system for similarity-based generative AI output filtering.

Reference is now made to FIG. 4, which shows another simplified example system 400. It may be appreciated that running a real-time comparison between a result from a generative AI model and a repository of pre-existing items, may be a time-consuming and computationally expensive operation. In some implementations, the system 400 may be configured in a two-stage process to carry out an initial filtering of a set of generated results based on comparison with pre-existing items in order to create a filtered set of outputs. That filtered set of outputs may then be used as the training data for configuring a second generative AI model that is then used for producing real-time results in reply to input prompts from user devices.

The system 400 may include a first generative AI model 402 configured using a training data set. The training data set may include a plurality of illustrative items selected for inclusion based on the objective of the AI model. For example, if the model is configured to suggest computer code, the training data set includes a large number of example portions of computer code. If the model is configured to suggest corporate logos, the training data set may include a large number of existing corporate logos. The training data set may include items protected by one or more forms of intellectual property and/or PII, and unavailable for free and unrestricted use, or available only under the terms of one or more user licenses.

The first generative AI model 402 is used to generate a plurality of outputs. To generate an output, the first generative AI model 402 takes a prompt. The prompts may be randomly selected from a set of candidate prompts in some cases. The prompts may be created by an administrator or other user. The first generative AI model 402 may be exposed in Beta testing to a set of users that may supply the prompts used to generate the outputs. In one example, the training data set is split into two portions, a first one of which is used as training data and a second one of which is used as input prompts. The portion used as training data may be substantially larger than the portion used as prompts in some embodiments. In some cases, each prompt may include one of the items from the second portion of data items plus a nonce or pseudo-randomized numeric or alphanumeric element.

During this first stage, the outputs generated by the first generative AI model 402 form the plurality of outputs, and are stored in memory. A similarity-assessment layer 404 may then be used to evaluate each of the outputs for similarity vis-à-vis a repository 406 of pre-existing items. The evaluation may include calculating a similarity measure that measures the similarity between the result and one of the items in the repository 406. The similarity measure may be a dissimilarity measure in some implementations. Measuring similarity may be based on a distance metric that quantifies the extent to which the output differs from the item from the repository 406. The distance metric may employ an L1 norm, L2 norm, Chebyshev distance, cosine distance, or others. In some implementations, both the output and the item from the repository 406 are processed through a simplifying filter and the filtered results are then compared to assess the distance metric.

The comparison may be carried out between the output and each item in the repository 406 in turn. The system may track the highest similarity measure and the corresponding item, in a search for the item from the repository 406 that is most similar to the output. In some cases, the comparison is a search-based operation in which the output is used as a search query and the repository 406 includes a query processing system that returns one or more items from the repository 406 that are determined to be closest to the output, and the similarity-assessment layer 404 may then determine a similarity measure for the output with regard to each of the returned items.

The similarity-assessment layer 404 evaluates the similarity measure of each output and filters the set of outputs to exclude one or more outputs based on their similarity measures so as to produce a set of filtered outputs 408. In some instances, this may include a preset threshold of maximum similarity, such that any outputs having a similarity measure above the threshold are filtered out and excluded. In some cases, where a dissimilarity measure is determined, the layer 404 may exclude any outputs that have a dissimilarity measure lower than a minimum threshold level.

The filtered outputs 408 thus exclude any outputs generated by the first generative AI model 402 from the original training data set that were found to be too similar to one or more of the pre-existing items in the repository 406. In some cases, the repository 406 contains the original training data set, such that the filtering operation excludes outputs that too closely resemble the training data, e.g. instances of rote learning or close-to rote learning. In some cases, the repository 406 contains other items, or other items in addition to the original training data set.

The filtered outputs 408 are then used as a second training data set for a second generative AI model 410. By filtering the outputs to exclude outputs too similar to the items from the repository 406, the system 400 produces a set of filtered outputs 408 that are each sufficiently different from the items of the repository 406 that it might be assumed that leakage of any of the outputs from the filtered outputs 408 through the second generative AI model 410 will not result in reproduction of an item from the original training data set. Moreover, the filtered outputs 408 may be sufficiently different from the items of the repository 406 that outputs generated by the second generative AI model 410 may be assumed to be sufficiently unlikely to be too close to the items in the repository 406. The second generative AI model 410 may be implemented in an online environment, providing a web or mobile interface to permit user devices to send one or more prompts and to reply with an output generated by the model 410.

While not guaranteed to differ entirely from the items of the repository 406, the filtering operation may make it sufficiently unlikely that the output of the second generative AI model 410 may be used directly without further analyzing if it is too close to items of the repository 406. Alternatively, in some embodiments, the system 400 may include a simple filter 412 at the output of the second generative AI model 410. The simple filter 412 may be a less computationally demanding filter, as compared to the similarity-assessment layer 404. In one example, the simple filter 412 may be configured to identify exact matches between an output from the second generative AI model 410 and an item in the repository 406. In one implementation, the simple filter 412 may hash the output, or portions of the output, of the second generative AI model 410 and may compare the hashed output to hash values of the items in the repository. In some cases, a bloom filter or the like may be used to determine if the repository 460 contains a match to the output.

If the simple filter 412 detects a match (or a close enough match if not configured to find only exact matches) then it may trigger re-running of the second generative AI model 410 in some implementations. The re-running of the second generative AI model 410 may occur with a change to the input, such as a modification to the prompt and/or a modification or addition of a pseudo-random code or nonce, as described above. In some cases, the simple filter 412 outputs a notification or error message if it detects an exact match. The notification or error message may be transmitted to the user device that sent the prompt, inviting the user to re-submit a new prompt.

FIG. 5 shows an example simplified method 500 for generating unique outputs that employs the two-stage system 400 described in conjunction with FIG. 4. The method 500 may be implemented, at least in part, using a computing system, such as the system 400 of FIG. 4.

The method 500 includes a first operation 502 of training the first generative AI model using the original training data set. The training may use all of the original training data set or a subset of items from the original training data set, i.e. a first portion of the training data. The first generative AI model is then used, in operation 504, to generate a plurality of outputs based on input of a plurality of prompts. In one implementation, the prompts are selected and input by an administrator or operator of the first generative AI model. As noted above, in some cases, the prompts may be drawn from a second portion of the training data set. The prompts may include a random or pseudorandom element, such as, for example, a nonce. In another implementation, the prompts are received from one or more user devices as the first generative AI model is made available and accessible over one or more computing networks. Access to the first generative AI model may be open or may be restricted to authorized users in some cases.

Howsoever generated, the prompts of operation 504 results in generation of the plurality of outputs. In operation 506, a similarity-assessment layer determines a similarity measure for each of the outputs. The similarity measure quantifies the degree of similarity between the output and a pre-existing item from the repository of pre-existing items. As noted above the similarity measure may be a dissimilarity measure in some implementations and various distance metrics, or other quantifications of similarity, may be used in determining the measure.

The layer 508 then filters the plurality of outputs to exclude outputs that are "too similar" to the items of the repository so as to produce a set of filtered outputs. Outputs may be determined to be "too similar" if their respective similarity measures exceed a threshold value. The threshold value may be set to a level based on the desired sensitivity of the filtering operation and the degree of difference from pre-existing items that is to be imposed on the filtered outputs.

Once the set of filtered outputs is generated, they are used to train a second generative AI model in operation 510. The second generative AI model may then be deployed to accept prompts from user devices over a computing network and to reply with results generated by the second generative AI model based on the prompts, as indicated by operation 512.

As indicated in dashed lines, the method 500 may, in some embodiments, include a filtering operation at the output of the second generative AI model. The filtering operation, indicated as operation 514, may be a less computationally intense operation than the similarity measure determination of operation 506. In some cases, the filtering operation may include determining whether the result from the second generative AI model is an exact match to an item from the repository. An exact match may result in blocking or discarding the result and sending a notification to the user device regarding an error, in some cases. In some cases, the filtering operation may include triggering re-running of the second generative AI model with an altered input when an exact match is identified for the generated result.

While the above-described method 500 suggests the outputs are first generated and then evaluated for similarity, it will be appreciated that each output may be evaluated for similarity prior to or in parallel with generation of the next or any number of subsequent outputs, and that the similarity-assessment layer need not await generation of all the plurality of outputs before undertaking its determination of similarity measures.

As noted above, the output or result generated by a generative AI model may be obtained through interpreting the intent and context of the prompt. In some cases, the generative AI model may be implemented with constraints on acceptable prompts. In some cases, this may include use of a prompt template. A prompt template may specify that prompts have a certain structure or constrained intents, or that acceptable prompts exclude certain classes of subject matter or intent, such as the production of results or outputs that are violent, pornographic, etc. In some instances, the prompt template is a standard and proprietary set of rules that are paired with the actual user-supplied prompt text and input to the generative AI model as a whole as the actual prompt. The user inputting prompt text is not privy to, nor able to access, the proprietary part of the prompt. In some cases, the initial or standard set of rules are in the form of seeding prompts and are input to the generative AI model as one or more initial or initialization prompts, at the beginning of a user session, before the AI is provided with the user-supplied prompt. The user-supplied prompt may itself be fed into the AI model in its raw form or wrapped in a further prompt template.

One of the challenges encountered with generative AI models, e.g. LLMs, is that hackers may be able to "trick" the AI, causing it to reveal information that it is not supposed to reveal. In particular, some people have succeeded in "prompt hacking" or "prompt hijacking" in which questions or instructions are input to a generative AI model that causes the model to reveal its prompt template(s), and/or other operating instructions or data, despite instructions to the AI model within the template itself not to reveal such data. The nature of generative AI models is such that it may be very difficult to give the AI model a categorical instruction that it cannot be convinced to reveal, even where that instruction is not to reveal the instruction.

In this sense, the term "prompt template" is intended to refer to a set of rules, initial prompts, or other system-provided inputs to the generative AI model. The prompt template, or portions of it, may be proprietary or confidential. The prompt template, or portions of it, may be input to the generative AI model prior to input of the user-provided prompt, or may be input to the generative AI model together with the user-provided prompt.

In one aspect, the present application provides a system and method to prevent prompt hacking of generative AI models. The system and method may employ a filter at the output of the generative AI model intended to detect disclosure of some or all of the prompt template. The filter may be a similarity-assessment layer, as described above, wherein the repository of pre-existing items is formed from the portions of the prompt template that are to be prevented from being disclosed.

The similarity-assessment layer may compare the output generated by an AI model to the portions of the prompt template so as to detect whether a portion, or a significant part of a portion, of the prompt templates appears in the output, In some cases, the similarity-assessment layer looks for an exact match. In some cases, it looks for a partial match, such as at least X bytes, symbols, words, etc., of the prompt template appearing in the output. In some cases it may compute a distance metric between the portion of the prompt template and the output of the model to assess the extent to which the portion of the prompt template appears in the output. A threshold level may be set to determine to what degree to which the prompt template must match the output before it is determined to be a disclosure of the prompt template.

If the similarity-assessment layer determined that there is more than a threshold similarity (which may be an exact match in some implementations) between the output and at least a portion of the prompt template, then it may block the output. In some cases, it may redact, delete, or replace the part of the output that matches the portion of the prompt template. In some cases, the similarity-assessment layer may replace the entirety of the output with a notification or other message indicating that the prompt provided is invalid or unpermitted or that it has been rejected.

In some cases, the similarity-assessment layer may cause the generative AI model to re-run, supplementing the user-provided prompt with an instruction, or a further instruction, not to produce an output that contains the portion of the prompt. The instruction may take the form AND NOT [portion of prompt template], or an equivalent instruction in textual form, such as "Do not include in the output [portion of prompt template]".

Figure 6A:
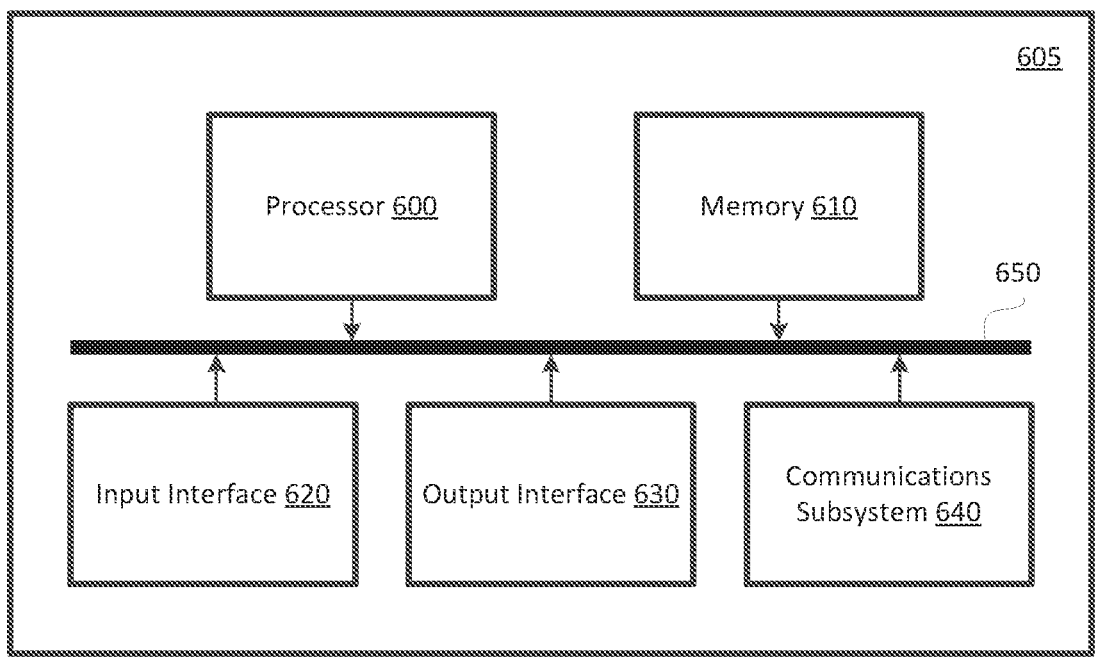
FIG. 6A is a high-level schematic diagram of an example computing device.

The above-described methods may be implemented by way of a suitably programmed computing device. FIG. 6A is a high-level operation diagram of an example computing device 605. The example computing device 605 may include a processor 600, a memory 610, an input interface 620, an output interface 630, and a communications subsystem 640. As illustrated, the foregoing example elements of the example computing device 605 are in communication over a bus 650.

The processor 600 is a hardware processor. The processor 600 may, for example, be one or more ARM, Intel x86, PowerPC processors or the like.

The memory 610 allows data to be stored and retrieved. The memory 610 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 605.

The input interface 620 allows the example computing device 605 to receive input signals. Input signals may, for example, correspond to input received from a user. The input interface 620 may serve to interconnect the example computing device 605 with one or more input devices. Input signals may be received from input devices by the input interface 620. Input devices may, for example, include one or more of a touchscreen input, keyboard, trackball or the like. In some embodiments, all or a portion of the input interface 620 may be integrated with an input device. For example, the input interface 620 may be integrated with one of the aforementioned examples of input devices.

The output interface 630 allows the example computing device 605 to provide output signals. Some output signals may, for example allow provision of output to a user. The output interface 630 may serve to interconnect the example computing device 605 with one or more output devices. Output signals may be sent to output devices by output interface 630. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface 630 may be integrated with an output device. For example, the output interface 630 may be integrated with one of the aforementioned example output devices.

The communications subsystem 640 allows the example computing device 605 to communicate with other electronic devices and/or various communications networks. For example, the communications subsystem 640 may allow the example computing device 605 to send or receive communications signals. Communications signals may be sent or received according to one or more protocols or according to one or more standards. For example, the communications subsystem 640 may allow the example computing device 605 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications subsystem 640 may allow the example computing device 605 to communicate using near-field communication (NFC), via Wi-Fi™, using Bluetooth™ or via some combination of one or more networks or protocols. Contactless payments may be made using NFC. In some embodiments, all or a portion of the communications subsystem 640 may be integrated into a component of the example computing device 605. For example, the communications module may be integrated into a communications chipset.

Software comprising instructions is executed by the processor 600 from a computer-readable medium. For example, software may be loaded into random-access memory from persistent storage of memory 610. Additionally, or alternatively, instructions may be executed by the processor 600 directly from read-only memory of memory 610.

Figure 6B:
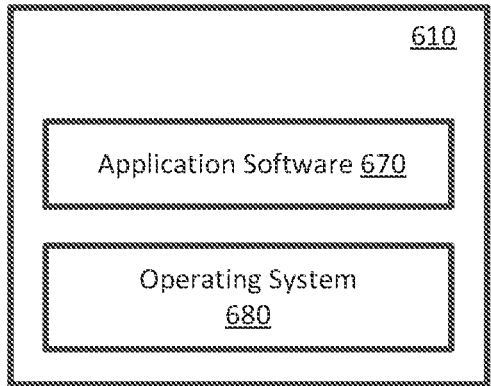
FIG. 6B shows a simplified organization of software components stored in a memory of the computing device of FIG. 6A.

FIG. 6B depicts a simplified organization of software components stored in memory 610 of the example computing device 605. As illustrated these software components include an operating system 680 and application software 670.

The operating system 680 is software. The operating system 680 allows the application software 670 to access the processor 600, the memory 610, the input interface 620, the output interface 630, and the communications subsystem 640. The operating system 680 may be, for example, Apple™ OS X, Android", Microsoft™ Windows™, a Linux distribution, or the like.

The application software 670 adapts the example computing device 605, in combination with the operating system 680, to operate as a device performing particular functions. Implementations The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   generating output content using a generative artificial intelligence (AI) model based on an input;
   determining, using a similarity-assessment layer, a similarity measure for the output content with respect to a repository of pre-existing content;
   comparing the similarity measure to a threshold value; and
   responsive to the comparing indicating excessive similarity, adjusting one or both of the input and the generative AI model, and re-generating new output content using the generative AI model.

2. The method of claim 1, further comprising repeating the generating, determining, comparing, adjusting, and re-generating until the new output content has a respective similarity measure at or below the threshold value.

3. The method of claim 1, wherein determining the similarity measure includes calculating a distance metric by comparing the output content to items in the repository of pre-existing content.

4. The method of claim 3, wherein comparing includes comparing the output content to each item in the repository of pre-existing content in turn to determine a distance value representing similarity between the output content and that item, and identifying the lowest distance value and the corresponding item as the most similar of the items to the output content.

5. The method of claim 1, wherein the input includes a prompt and wherein adjusting the input includes changing the prompt.

6. The method of claim 5, wherein the prompt includes text and wherein changing the prompt includes changing the text.

7. The method of claim 6, wherein changing the text includes one or more of replacing a word in the text with an alternative word, changing an order of words in the text, or changing a verb tense for one or more words in the text.

8. The method of claim 1, wherein the input includes a seed value, and wherein adjusting the input includes changing the seed value.

9. The method of claim 1, wherein the output content includes a text output and wherein the similarity-assessment layer determines an infringement probability value by comparing the text output to content in one or more databases and finding a match within a threshold value between the text output and a pre-existing text in the one or more databases.

10. The method of claim 1, wherein the output content includes a textual or graphic brand and wherein the similarity-assessment layer determines an infringement probability value by comparing the textual or graphic brand with trademarks in one or more trademark databases and finding a match within a threshold value between the textual or graphic brand and at least one trademark.

11. The method of claim 10, wherein the similarity-assessment layer further receives product or service data associated with the textual or graphic brand, and wherein comparing and finding includes comparing the product or service data with goods and services data associated with trademarks in the one or more trademark databases.

12. The method of claim 1, wherein the similarity-assessment layer includes a machine learning model trained on an intellectual property infringement data set.

13. A computing system, comprising:
   a processor; and
   memory coupled to the processor, the memory storing computer-executable instructions that, when executed by the processor, configure the processor to:
      generate output content using a generative artificial intelligence (AI) model based on an input;
      determine, using a similarity-assessment layer, a similarity measure for the output content with respect to a repository of pre-existing content;
      compare the similarity measure to a threshold value; and
      responsive to the comparing indicating excessive similarity, adjust one or both of the input and the generative AI model, and re-generate new output content using the generative AI model.

14. The computing system of claim 13, wherein the instructions, when executed, are to further cause the processor to repeat the generating, determining, comparing, adjusting, and re-generating until the new output content has a respective similarity measure at or below the threshold value.

15. The computing system of claim 13, wherein the instructions, when executed, are to further cause the processor to determine the similarity measure at least in part by calculating a distance metric by comparing the output content to items in the repository of pre-existing content.

16. The computing system of claim 15, wherein comparing includes comparing the output content to each item in the repository of pre-existing content in turn to determine a distance value representing similarity between the output content and that item, and identifying the lowest distance value and the corresponding item as the most similar of the items to the output content.

17. The computing system of claim 13, wherein the input includes a prompt and wherein the instructions, when executed, are to further cause the processor to adjust the input by changing the prompt.

18. The computing system of claim 17, wherein the prompt includes text and wherein the instructions, when executed, are to further cause the processor to change the prompt by changing the text.

19. The computing system of claim 18, wherein the instructions, when executed, are to further cause the processor to change the text by, at least, one or more of replacing a word in the text with an alternative word, changing an order of words in the text, or changing a verb tense for one or more words in the text.

20. A non-transitory processor-readable medium storing processor-executable instructions that, when executed by a processor, are to cause the processor to:

generate output content using a generative artificial intelligence (AI) model based on an input;

determine, using a similarity-assessment layer, a similarity measure for the output content with respect to a repository of pre-existing content;

compare the similarity measure to a threshold value; and responsive to the comparison indicating excessive similarity, adjust one or both of the input and the generative AI model, and re-generate new output content using the generative AI model.

\* \* \* \* \*